US010737529B2

United States Patent
Fidelfatti et al.

(10) Patent No.: US 10,737,529 B2
(45) Date of Patent: Aug. 11, 2020

(54) SPOKE ATTACHMENT FLANGE FOR A HUB FOR A BICYCLE WHEEL, METHOD FOR MOUNTING A SPOKE ON THE FLANGE AND METHOD FOR MANUFACTURING THE HUB

(71) Applicant: Campagnolo S.r.l., Vicenza (IT)

(72) Inventors: Enrico Fidelfatti, Vincentino (IT); Leonardo Antonio Demelio, Ruvo di Puglia (IT)

(73) Assignee: Campagnolo S.r.l., Vicenza (IT)

( * ) Notice: Subject to any disclaimer, the term of this patent is extended or adjusted under 35 U.S.C. 154(b) by 0 days.

(21) Appl. No.: 16/399,065

(22) Filed: Apr. 30, 2019

(65) Prior Publication Data

US 2019/0337326 A1  Nov. 7, 2019

(30) Foreign Application Priority Data

May 2, 2018  (IT) ......................... 102018000004988

(51) Int. Cl.
*B60B 1/04* (2006.01)

(52) U.S. Cl.
CPC .............. *B60B 1/042* (2013.01); *B60B 1/041* (2013.01); *B60B 2320/10* (2013.01); *B60B 2900/325* (2013.01)

(58) Field of Classification Search
CPC ......... B60B 1/003; B60B 1/041; B60B 1/042; B60B 27/023; Y10T 29/49519
See application file for complete search history.

(56) References Cited

U.S. PATENT DOCUMENTS

| 5,626,401 | A | | 5/1997 | Terry, Sr. et al. |
| 5,795,036 | A | * | 8/1998 | Campagnolo ......... B60B 1/0261 301/59 |
| 6,010,197 | A | * | 1/2000 | Crosnier ............... B60B 27/023 301/110.5 |
| 7,354,114 | B2 | * | 4/2008 | Passarotto ............... B60B 1/003 301/104 |
| 7,621,601 | B2 | | 11/2009 | Chiang |

(Continued)

FOREIGN PATENT DOCUMENTS

| EP | 1 685 979 A1 | 8/2006 |
| EP | 1 923 232 A1 | 5/2008 |

OTHER PUBLICATIONS

Italian Search Report and Written Opinion in Italian Application No. 102018000004988, dated Dec. 17, 2018, with English translation.

(Continued)

*Primary Examiner* — Kip T Kotter
(74) *Attorney, Agent, or Firm* — Volpe and Koenig, P.C.

(57) ABSTRACT

A spoke attachment flange for a bicycle wheel hub is disclosed. The flange has a plurality of seats for housing enlarged spoke heads. Each spoke seat has an access hole that allows the insertion of the enlarged spoke head and an outlet opening that holds the enlarged spoke head when the spoke is tensioned. The access hole and the outlet opening are spaced circumferentially and connected through a connection channel so that an abutment surface abuts the enlarged head and prevents the enlarged head from exiting through the outlet opening. Methods for manufacturing the hub and mounting a spoke on the flange are also disclosed.

15 Claims, 8 Drawing Sheets (56) References Cited

U.S. PATENT DOCUMENTS

| | | | |
|---|---|---|---|
| 9,604,495 B2* | 3/2017 | Spahr | B60B 27/023 |
| 9,724,959 B2* | 8/2017 | Meggiolan | B60B 3/04 |
| 2005/0161998 A1* | 7/2005 | Passarotto | B60B 1/003 |
| | | | 301/61 |
| 2008/0116738 A1* | 5/2008 | Urbani | B60B 1/003 |
| | | | 301/110.5 |
| 2008/0129105 A1 | 6/2008 | Urbani et al. | |
| 2010/0322546 A1* | 12/2010 | Bosboom | B60B 27/023 |
| | | | 384/545 |
| 2016/0207354 A1 | 7/2016 | Senoo | |
| 2017/0305188 A1 | 10/2017 | Spahr et al. | |
| 2017/0305189 A1 | 10/2017 | Spahr et al. | |

OTHER PUBLICATIONS

Italian Search Report and Written Opinion in Italian Application No. 102018000004994, dated Dec. 19, 2018, with English translation.

* cited by examiner

SPOKE ATTACHMENT FLANGE FOR A HUB FOR A BICYCLE WHEEL, METHOD FOR MOUNTING A SPOKE ON THE FLANGE AND METHOD FOR MANUFACTURING THE HUB

CROSS REFERENCE TO RELATED APPLICATION(S)

This application claims the benefit of Italian Patent Application No. 102018000004988, filed on May 2, 2018, which is incorporated herein by reference as if fully set forth.

FIELD OF INVENTION

The present invention relates to a spoke attachment flange for a hub for a bicycle wheel, as well as a hub for a bicycle wheel including such a flange.

The invention also relates to a method for manufacturing a hub for a bicycle wheel.

BACKGROUND

The aforementioned wheel can be a front wheel or a rear wheel of the bicycle. Such a bicycle can be a mountain-bike, a leisure bicycle or a racing bicycle.

As known, a bicycle wheel comprises a plurality of spokes extending between the hub, which constitutes the central element of the wheel intended to be associated with the frame of the bicycle, and the rim on which the tyre is mounted.

The hub comprises a substantially tubular body (hereinafter indicated as "hub body") comprising, at each of the opposite free end portions thereof, a spoke attachment flange.

The spoke attachment flange can be made in a single piece with the hub body or can be made as a distinct piece from the hub body to then be stably associated with the hub body.

Straight-head spokes and curved-head spokes are known. In straight-head spokes the end portion for attaching to the hub extends coaxially to the longitudinal axis of the elongated body of the spoke (hereinafter also indicated as "stem"), whereas in curved-head spokes the end portion for attaching to the hub is curved, i.e. extends along a direction inclined by a predetermined angle with respect to the longitudinal axis of the stem of the spoke.

Typically, the spoke attachment flanges comprise an annular body extending coaxially to a rotation axis and comprising a plurality of seats for housing enlarged heads of the spokes.

U.S. Pat. No. 7,621,601 and US 2017/0305189 describe spoke attachment flanges with seats for housing enlarged heads of spokes. Each of these seats comprises an access hole made on a front face (anterior front face in the case of US 2017/0305189 and rear front face in the case of U.S. Pat. No. 7,621,601) of the flange to allow the insertion of the enlarged head of the spoke in the seat, and a slit made on a radially outer surface of the annular body and on the anterior front face to allow the positioning of the spoke and the subsequent tensioning thereof.

The Applicant has found that the spokes can become detensioned. Detensioning can occur for example due to the uneven road surface or due to the presence of steps or sudden obstacles.

The detensioning of the spokes can result in the accidental exit of the spokes from the respective housing seats, with the risk of damaging the hub, other spokes or other components mounted on the hub, like for example the brake disc (in the case of bicycles with a disc brake) or the sprockets mounted on the freewheel (in the case of a hub for a rear wheel), and consequent danger for the cyclist.

SUMMARY

The technical problem at the basis of the present invention is to make a spoke attachment flange for a hub for a bicycle wheel that eliminates or drastically reduces the aforementioned risks of an accidental exit of the spokes in the case of detensioning.

BRIEF DESCRIPTION OF THE DRAWINGS

Further features and advantages of the invention will become clear from the following description of preferred embodiments made with reference to the attached drawings where.

DETAILED DESCRIPTION OF THE PREFERRED EMBODIMENTS

In the present description and in the following claims, the terms "axial", "axially" and similar terms are used to refer to a direction substantially coinciding with or substantially parallel to the rotation axis of the flange or of the hub, the terms "radial", "radially" and similar terms are used to refer to a direction perpendicular to the rotation axis of the flange or of the hub, and the terms "circumferential", "circumferentially" and similar terms are used to refer to a circumferential direction around the rotation axis of the flange or of the hub.

The terms "axially inner" and "axially outer" and similar terms are used to refer to positions closer to, and farther from, a transversal mid-plane of the hub, respectively, whereas the terms "radially inner" and "radially outer" and similar terms are used to refer to positions closer to, and farther from, the rotation axis of the flange or of the hub, respectively.

The terms "rear", "behind" and similar terms are used to refer to a side facing towards the transversal mid-plane of the hub, whereas the term "front", "frontally" and similar terms are used to refer to a side facing the opposite way with respect to the transversal mid-plane of the hub, i.e. the side seen from an axially outer position with respect to the hub.

The term "front face" is used to refer to a face orthogonal to the rotation axis of the flange or of the hub. Each flange of the hub thus has an "anterior front face" facing the opposite way with respect to the transversal mid-plane of the hub and a "rear front face" facing towards the transversal mid-plane of the hub.

The present invention therefore relates to a spoke attachment flange for a hub for a bicycle wheel, said flange comprising an annular body extending coaxially to a rotation axis, said annular body comprising a plurality of seats for housing enlarged heads of spokes, each of said seats comprising:

an access hole made on a front face (preferably the anterior front face) of said annular body and configured to allow the insertion of the enlarged head of a spoke in said seat;

an outlet opening that opens onto a radially outer surface of said annular body and onto said front face and configured to hold said enlarged head in said seat when the spoke is tensioned;

wherein said access hole and said outlet opening are circumferentially spaced apart from each other and are connected to one another through a connection channel made on said front face and comprising, at least close to or at said outlet opening, at least one front abutment surface configured to go into abutment against said enlarged head in the case of detensioning of the spoke, thus preventing an axial exit of said enlarged head from said outlet opening.

Advantageously, in the flange of the invention the spoke housing seats have a geometry such as to obstruct the accidental exit of the spokes in the case of detensioning. This is obtained thanks to the provision of the aforementioned front abutment surface, which prevents exit of the head of the spoke when the spoke is at the outlet opening, and the aforementioned connection channel, which, when the spoke is detensioned, prevents the head of the spoke from being able to exit from the aforementioned access hole. In practice, in order to exit from the seat the enlarged head must necessarily cross a path contrary to that followed in the mounting step of the spoke in the flange, and it is very difficult to occur in the case of the spoke detensioning.

Preferably, the spokes intended to be mounted in the flange of the invention have a straight head.

The spoke attachment flange of the invention can comprise, singularly or in combination, one or more of the following preferred characteristics.

Preferably, said connection channel comprises a first front abutment surface extending up to said outlet opening.

Advantageously, such a first front abutment surface prevents the enlarged head from being able to exit from the seat, when—following detensioning of the spoke—it tends to move along a radially inner direction in the aforementioned outlet opening.

Preferably, said connection channel comprises a second front abutment surface extending up to close to said outlet opening.

Advantageously, such a second front abutment surface prevents the enlarged head from being able to exit from the seat, when accidentally—upon detensioning of the spoke—it moves along the connection channel after having moved in a radially inner direction in the aforementioned outlet opening.

Preferably, said first front abutment surface is arranged in a radially inner position with respect to said second front abutment surface.

Advantageously, the first front abutment surface and the second front abutment surface act in abutment on the enlarged head on opposite sides when the latter is arranged at the connection channel or in a radially inner end portion of the outlet opening.

Preferably, said connection channel extends along a substantially circumferential direction between said access hole and a radially inner end portion of said outlet opening.

Preferably, said seat comprises, in a radially inner position with respect to said outlet opening, a substantially spherical first seat portion. In this case, the enlarged head preferably comprises conical or spherical surfaces matching the surface of the aforementioned first seat portion. Such a first seat portion can be made through a ball nose milling cutter.

Advantageously, the aforementioned first seat portion ensures an effective abutment against the enlarged head of the spoke, after the spoke has been tensioned.

Preferably, part of the first front abutment surface defines the surface of said first seat portion.

In a preferred embodiment, said outlet opening extends along a substantially radial direction, so as to be able to obtain an arrangement of the spokes on the hub according to a radial configuration.

Preferably, said access hole extends along a substantially axial direction.

In this case, the mounting of the spoke in the flange of the invention initially comprises the insertion of the enlarged head thereof in the access hole parallel to the rotation axis of the flange. The enlarged head is subsequently made to slide inside the connection channel until it reaches the outlet opening (i.e. the substantially spherical first seat portion). At the end of the path, the spoke is rotated by about 90°, from the substantially axial direction to a substantially radial direction, so as to position its stem in the outlet opening and then be able to proceed with the tensioning of the spoke.

Preferably, said access hole has a substantially cylindrical shape.

Such an access hole can be made through a ball nose milling cutter, for example the same ball nose milling cutter used to make the aforementioned first seat portion, or through a different tool, like for example a front cylindrical cutter or a drill bit.

Preferably, said connection channel comprises a first channel portion having a first radial width substantially equal to that of said access hole and, in a position axially adjacent to said first channel portion, a second channel portion having a radial width smaller than said first radial width and such as to allow the passage of a stem of the spoke.

Preferably, said first channel portion is substantially spherical.

The first channel portion can be made with a ball nose milling cutter (even the same ball nose milling cutter possibly used to make the access hole), by simply moving the ball nose milling cutter from the access hole.

The second channel portion can be made through a cylindrical cutter.

The aforementioned first seat portion is made after having made the connection channel, again with the aforementioned ball nose milling cutter.

Preferably, the second front abutment surface is defined at such a first channel portion.

More preferably, the second front abutment surface defines the spherical surface of said first channel portion.

In a preferred embodiment of the invention, said outlet opening has a substantially constant circumferential width in the radial direction and such as to allow a stem of the spoke to be housed therein.

Such an outlet opening can be made through a cylindrical cutter.

In a second aspect thereof, the invention relates to a hub for a bicycle wheel comprising a flange according to the first aspect of the invention described above.

Such a hub can comprise, singularly or in combination, one or more of the preferred characteristics discussed above with respect to the flange of the invention.

In a further aspect thereof, the invention relates to a method for mounting a spoke on a flange of a hub for a bicycle wheel, said spoke comprising an enlarged head and a stem, the method comprising the steps of:
  inserting said enlarged head in an access hole made on a front face of the flange;
  moving said spoke from said access hole until an outlet opening circumferentially spaced apart from said access hole and that opens onto a radially outer surface of said flange and onto said front face is reached, said movement being carried out by acting on said stem and making said enlarged head slide along a connection channel made on said front face and connecting said access hole to said outlet opening;
  when said enlarged head has reached said outlet opening, rotating said spoke until said stem is housed in said outlet opening;
  tensioning the spoke.

In a further aspect thereof, the present invention relates to a method for manufacturing a hub for a bicycle wheel, the method comprising the steps of:
  making a flange having an annular body extending coaxially to a rotation axis;
  forming on said annular body a plurality of seats for housing enlarged heads of spokes, wherein each of said seats is formed through the following steps:
    making on a front face (preferably the anterior front face) of said annular body an access hole having dimensions such as to allow the insertion of an enlarged head of a spoke in said seat;
    making in said annular body a connection channel extending from said access hole along a non-radial direction and having at least one front abutment surface configured to go into abutment against said enlarged head in the case of detensioning of the spoke;
    making an outlet opening that opens onto a radially outer surface of said annular body and onto said front face until said connection channel is reached, said outlet opening being configured to hold said enlarged head in said seat when the spoke is tensioned.

Advantageously, such a method makes it possible to make a flange having all of the advantageous characteristics of the flange described above with reference to the first aspect of the invention.

Preferably, said connection channel is made through a first tool, more preferably through a ball nose milling cutter.

Preferably, said outlet opening is made through a cylindrical cutter.

In all of the figures, the reference numeral 100 wholly indicates a hub for a bicycle wheel in the different embodiments.

In particular, the hub 100 is a hub for a bicycle rear wheel and comprises a substantially tubular body, or hub body, 102 inside which a shaft (not illustrated) is provided. Such a shaft is rotatably associated with the hub body 102 through suitable bearings (not illustrated) fitted onto the opposite free end portions of the shaft and it is intended to be connected, at such opposite free end portions, to the frame of the bicycle.

The hub 100 has rotation axis X.

The hub body 102 can be made of a metallic material, for example aluminum or alloys thereof, or of a composite material. The term "composite material" is used to indicate a material comprising structural fibers incorporated in a polymeric material. The structural fibers are preferably selected from the group comprising carbon fibers, glass fibers, boron fibers, aramid fibers, ceramic fibers and combinations thereof. The polymeric material can be thermoplastic or thermosetting.

Spoke attachment flanges 120, 220 are provided at each of the opposite free end portions of the hub body 102. The flanges 120, 220 can be made in a single piece with the hub body 102 or can be made (one or both) as distinct pieces from the hub body 102 to then be stably associated with the hub body 102. In the example illustrated herein, the flanges 120, 220 are different from each other and the flange 220 is the one in accordance with the present invention.

A plurality of respective spokes 12, described below, are mounted on the flanges 120, 220.

The hub 100 can also comprise a brake disc (not illustrated). In this case, the brake disc is mounted on the hub 100 in an axially outer position with respect to the flange 120, on a suitable axial mounting portion 150.

A freewheel (not illustrated) for supporting a sprocket assembly of the rear gearshift of the bicycle is associated with the hub 100, in an axially outer position with respect to the flange 220. The freewheel is thus mounted on the hub 100 on the axially opposite side with respect to the axial mounting portion 150 of the brake disc.

Each flange 120, 220 can be made of a metallic material, for example aluminum or alloys thereof, or of a composite material.

With initial reference to FIGS. 1-6, the flange 120 is described in detail.

Figure 1:
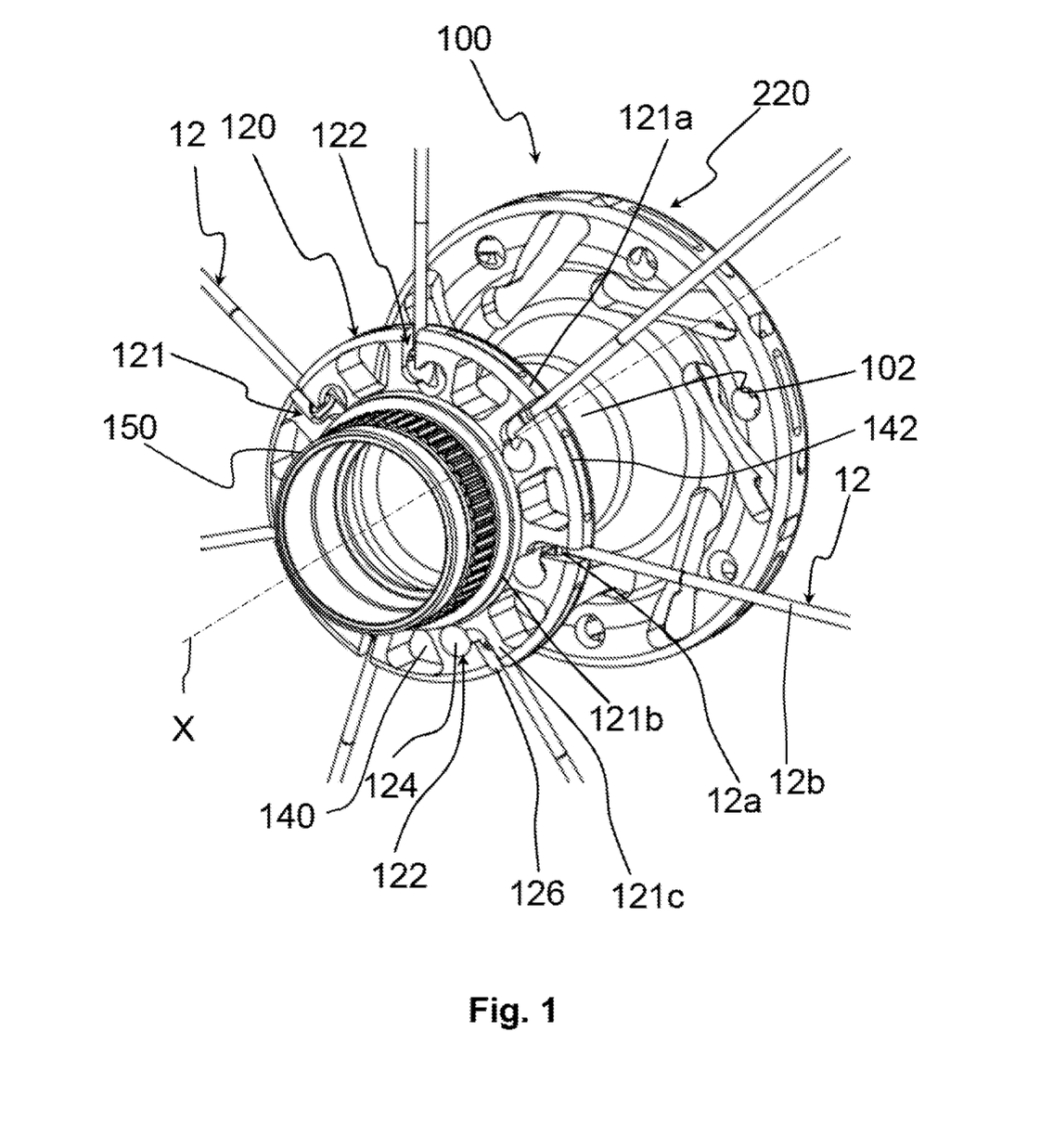
FIG. 1 is a perspective view of a first embodiment of a hub for a bicycle wheel in accordance with the present invention, such a hub comprising a first flange on which respective spokes have been mounted and a second flange on which respective spokes must be mounted, the hub being illustrated as it is seen when observing its first flange in the foreground.

In the non-limiting example illustrated in FIG. 1, the spokes 12 mounted on the flange 120 are straight-head spokes and, when they are mounted on the wheel, extend entirely in substantially radial planes, with more or less large camber angles. For example, the camber angle can be comprised between about 1° and about 15°, with reference to a plane orthogonal to the rotation axis X of the hub 100, which also corresponds to the rotation axis of the flange 120.

Each spoke 12 comprises an enlarged head 12a and an elongated body or stem 12b (FIGS. 1, 4-6).

The enlarged head 12a has a substantially circular cross section and preferably comprises conical or spherical surfaces.

The flange 120 comprises an annular body 121 that extends coaxially to the rotation axis X of the hub 100.

The annular body 121 comprises a radially outer surface 121a that, in the specific example illustrated herein, has a substantially cylindrical shape.

The annular body 121 further comprises a radially inner portion 121b, also having a substantially cylindrical shape, which is associated with the respective free end portion of the hub body 102.

The annular body 121 comprises a plurality of seats 122 for housing the enlarged heads 12a of the spokes 12.

The seats 122 are circumferentially equally spaced apart from each other.

In the non-limiting example illustrated in FIGS. 1-6, seven seats 122 are provided circumferentially spaced apart from each other by about 51°. In order not to complicate the reading of FIGS. 1-6, the reference numerals relative to the seats 122 and to the various portions of the seats 122 have been indicated only for some of the seven seats which are illustrated.

Each seat 122 comprises an access hole 124 configured to allow a first spoke 12 to be mounted in the seat 122.

The access hole 124 is made on an anterior front face 121c of the annular body 121. Preferably, such a front face 121c is substantially flat and substantially orthogonal to the rotation axis X.

In the case in which the hub 100 is intended to support a brake disc, the latter is arranged coaxially to the rotation axis X in a position axially adjacent to the aforementioned anterior front face 121c.

In the non-limiting example illustrated in FIGS. 1-6, the access hole 124 extends along a substantially axial direction and has a substantially cylindrical shape.

The access hole 124 can be a through hole (like in the non-limiting example illustrated in FIGS. 1-6) or a blind hole.

As explained below, the access hole 124 can be made through a ball nose milling cutter or through a front cylindrical cutter or a drill bit.

The access hole 124 has dimensions such as to allow the insertion of the enlarged head 12a of a first spoke 12.

Each seat 122 further comprises an outlet opening, which in the specific example illustrated herein is defined by a slit 126, configured to hold the enlarged head 12a in the seat 122 when the spoke 12 is tensioned.

The slit 126 is made so as to open onto the radially outer surface 121a of the annular body 121 and onto the anterior front face 121c.

In the non-limiting example illustrated in FIGS. 1-6, the slit 126 extends along a substantially radial direction.

The slit 126 has a substantially constant circumferential width in the radial direction and such as to allow the stem 12b of the spoke 12 to be housed.

As explained below, such a slit 126 can be made through a cylindrical cutter.

Figures 2, 3:
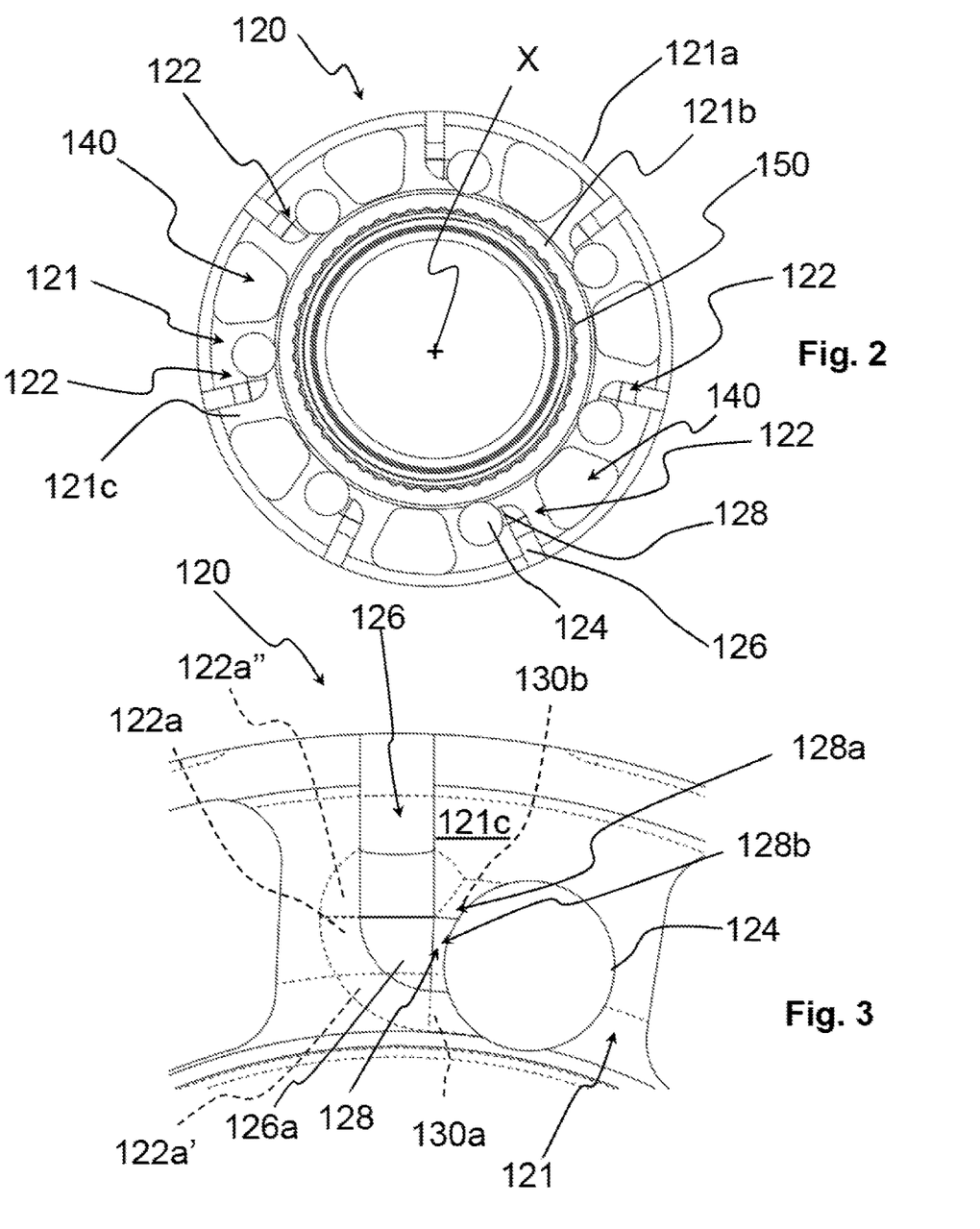
FIG. 2 is an anterior front view of the first flange of the hub of FIG. 1 before the respective spokes are mounted.
FIG. 3 is an enlarged anterior front view of a detail of the first flange of the hub of FIG. 2.

As more clearly illustrated in the enlargement of FIG. 3, the access hole 124 and the slit 126 are circumferentially spaced apart from each other and are connected to one another through a connection channel 128.

In particular, the center of the access hole 124 and the central axis of the slit 126 are angularly spaced apart from each other, preferably by an angle comprised between 5° and 60°, the extreme values being included. For example, in the case in which the flange 120 is configured for the attachment of seven spokes extending along respective radial directions, the aforementioned angle is equal to 11°.

The connection channel 128 is made on the anterior front face 121c and, in the non-limiting example illustrated in FIGS. 1-6, extends along a substantially circumferential direction between the access hole 124 and a radially inner end portion 126a of the slit 126.

As illustrated in FIG. 3, the connection channel 128 comprises a first front abutment surface 130a and a second front abutment surface 130b, arranged on radially opposite sides of the connection channel 128. In particular, the first front abutment surface 130a is arranged in a radially inner position with respect to the second front abutment surface 130b.

The first front abutment surface 130a extends up to the slit 126, starting from the access hole 124. The second front abutment surface 130b extends up to close to the slit 126, again starting from the access hole 124.

Each front abutment surface 130a, 130b is configured to go into abutment against the enlarged head 12a in the case of detensioning of the spoke 12, thus preventing the axial exit of the enlarged head 12a from the slit 126.

Again with reference to FIG. 3, each seat 122 comprises, in a radially inner position with respect to the slit 126, a substantially spherical first seat portion 122a having a surface that, preferably, matches the conical or spherical surfaces of the enlarged head 12a of the spoke 12. As explained below, such a first seat portion 122a can be made through a ball nose milling cutter.

Each seat portion 122a has a radially inner first surface part 122a' that is substantially spherical and a radially outer second spherical surface part 122a".

The first front abutment surface 130a extends up to the first seat portion 122a. In particular, the first front abutment surface 130a joins to the first surface part 122a' of the first seat portion 122a, whereas the slit 126 separates the second front abutment surface 130b from the second spherical surface part 122a".

Again with reference to FIG. 3, the connection channel 128 comprises a first channel portion 128a having a first radial width lower than or equal to that of the access hole 124 and, in a position axially adjacent to the first channel portion 128a, on the side facing towards the front face 121c of the annular body 121, a second channel portion 128b having a radial width smaller than the first radial width and such as to allow the passage of the stem 12b of the spoke.

The first channel portion 128a is substantially spherical.

The first abutment surface 130a and the second abutment surface 130b join the first channel portion 128a to the second channel portion 128b.

As explained below, the first channel portion 128a, 128b can be made through a ball nose milling cutter, whereas the second channel portion 128b can be made through a cylindrical cutter.

As illustrated in FIG. 2, the annular body 121 further comprises a plurality of weight-reduction through openings 140, each of which is arranged between two circumferentially consecutive seats 122.

Figure 10:
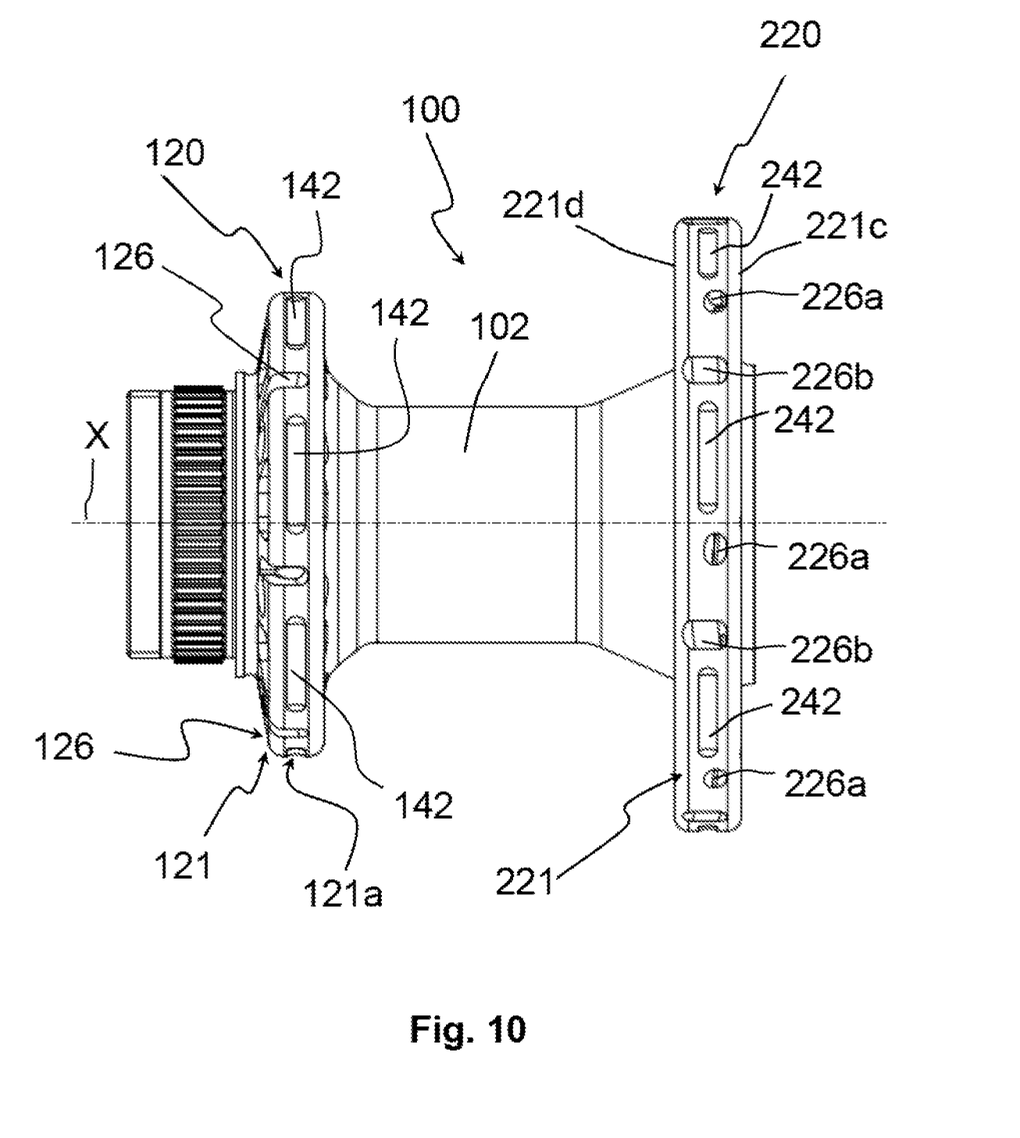
FIG. 10 is a side view of the hub of FIG. 1 before the spokes are mounted on the first flange and on the second flange.

As illustrated in FIG. 10, a plurality of weight-reducing non-through recesses 142 is provided on the radially outer surface 121a of the annular body 121, each of which is arranged between two circumferentially consecutive seats 122, preferably at a respective weight-reducing through opening 140.

A hub 100 of the type discussed above can be manufactured with the manufacturing method described below. Reference is made in particular to the case in which the hub 100 or at least the flange 120 are made of a metallic material, such as aluminum or alloys thereof.

Once the flange 120 has been made, a plurality of seats 122 for housing the enlarged heads 12a of the spokes 12 are formed on the annular body 121 thereof.

Each of the seats 122 is formed by making the access hole 124, the connection channel 128 and the slit 126 as described below.

The access hole 124 is made on the front face 121c of the annular body 121 using a first tool (not illustrated). Such a first tool can be a ball nose milling cutter, a front cylindrical cutter or a drill bit.

Through a cylindrical cutter the slit 126 is made on the radially outer surface 121a and on the front face 121c of the annular body 121 and the second channel portion 128b is made on the front face 121c.

Thereafter, through a ball nose milling cutter the first seat portion 122a and the first channel portion 128a are made. The connection channel 128 is thus obtained.

Such a connection channel 128 extends from the access hole 124 along a direction which is different from the radial direction and from the axial direction. In the non-limiting example of the hub 100 illustrated in FIGS. 1-6, the connection channel 128 extends along a circumferential direction.

The ball nose milling cutter defines the two front abutment surfaces 130a, 130b in the connection channel 128.

Figure 4:
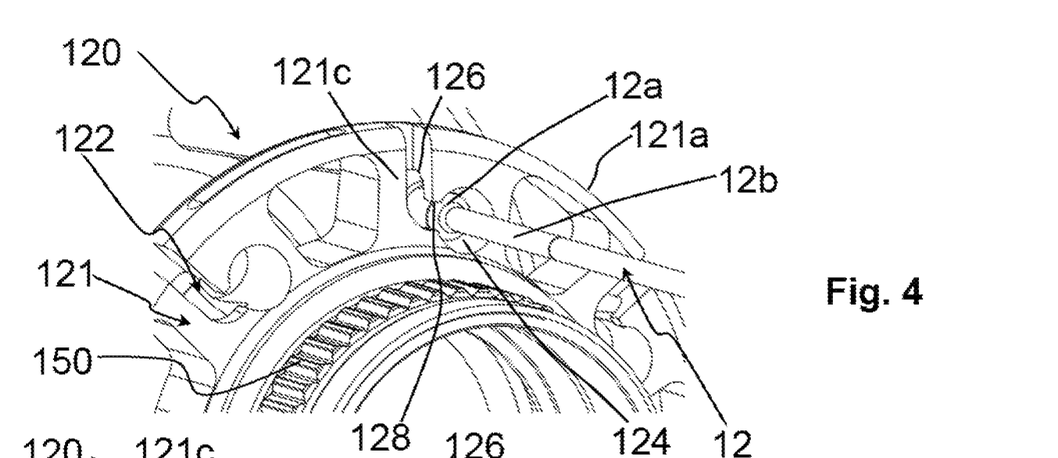
FIGS. 4-6 are enlarged perspective views of a portion of the hub of FIG. 1 and of a spoke in three successive steps of its mounting in the first flange.
Figure 5:
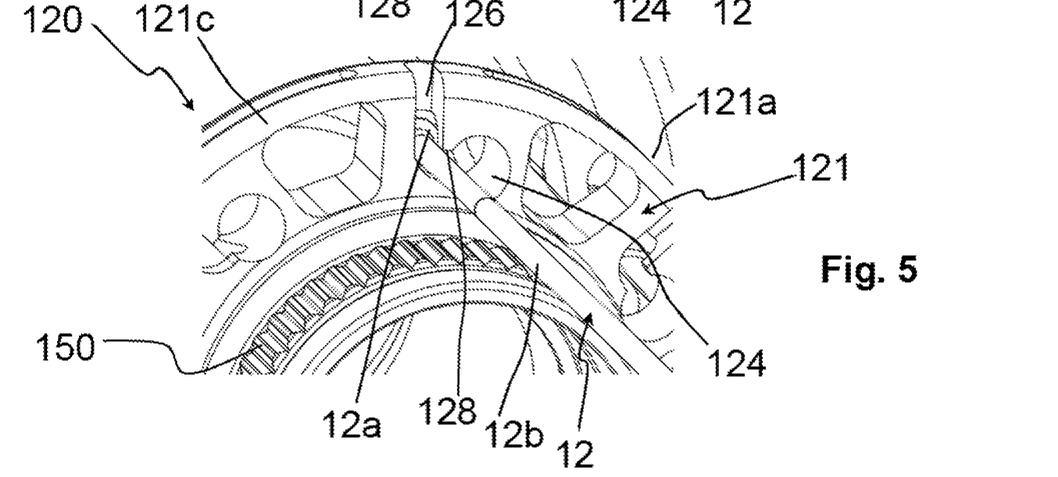
Figure 6:
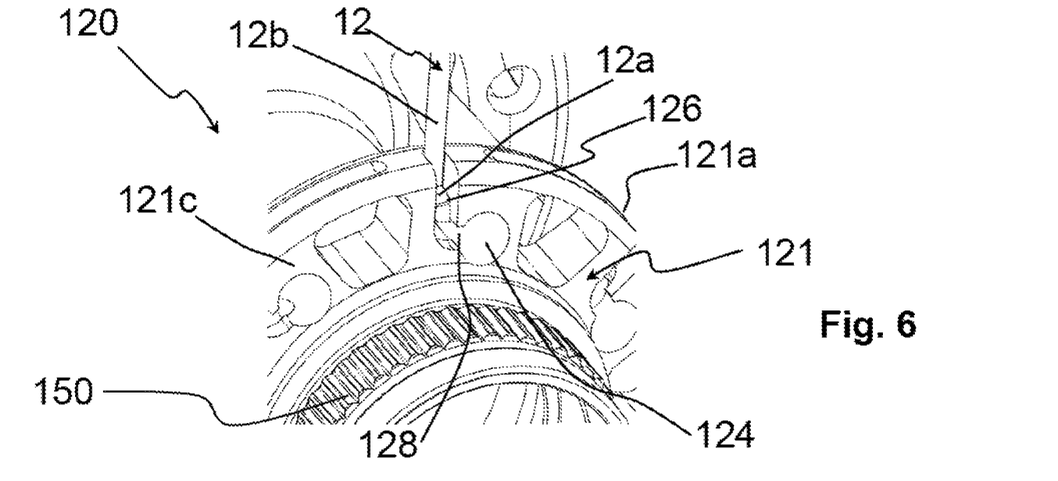
Figure 7:
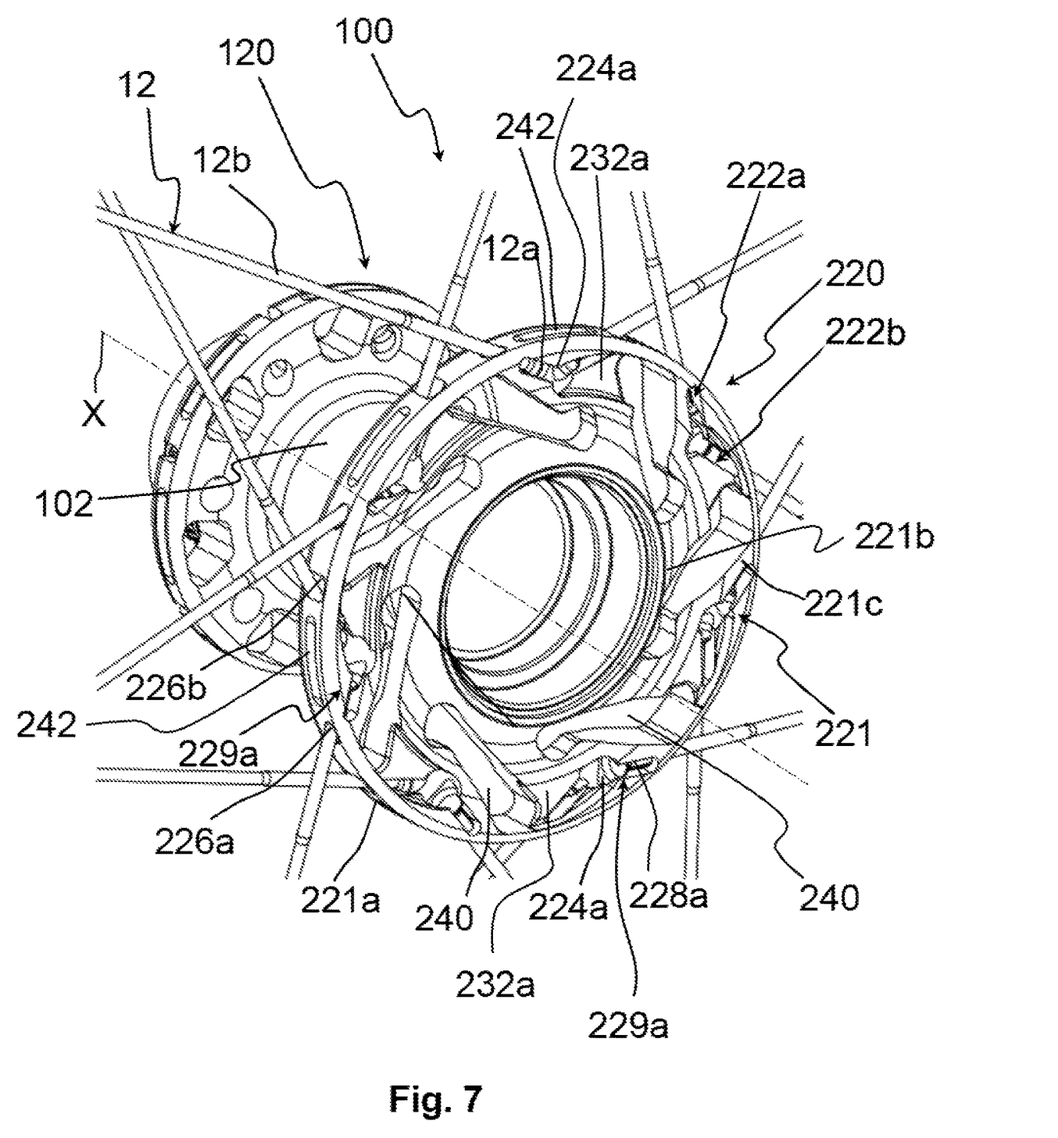
FIG. 7 is a perspective view of the hub of FIG. 1 seen from an observation point axially opposite to that of FIG. 1, i.e. when observing its second flange in the foreground, and wherein respective spokes must be mounted on the first flange and respective spokes have been mounted on the second flange.

The mounting of the spokes 12 on the flange 120 takes place as described below. Reference is made to FIGS. 4-6.

Initially, the enlarged head 12a of a spoke 12 is inserted in the access hole 124, keeping the spoke 12 substantially parallel to the rotation axis X of the hub 124 (FIG. 4).

The spoke 12 is subsequently made to slide inside the connection channel 128 until the slit 126 is reached, in particular the first seat portion 122a, corresponding to the radially inner end portion 126a of the slit 126 (FIG. 5). During the sliding of the spoke 12 in the connection channel 128, the enlarged head 12a of the spoke 12 slides in the first channel portion 128a whereas the stem 12b of the spoke 12 slides in the second channel portion 128b and exits from the front face 121c of the annular body 121 according to a direction substantially parallel to the rotation axis X of the hub 124.

Once the seat portion 122a has been reached, the stem 12b of the spoke 12 is rotated by about 90° so as to be positioned in the slit 126 and then be able to proceed with the tensioning of the spoke 12 (FIG. 6).

Following the tensioning of the spoke 12, the enlarged head 12a thereof goes into abutment against the radially outer portion of the first seat portion 122a.

The hub of the invention can also be used in a front wheel of the bicycle, possibly also provided with a brake disc.

In the non-limiting example described herein and illustrated in FIG. 1, the flange 220 is different from the flange 120 and has the features described below with reference to FIGS. 7-10.

Alternatively, the flange 220 can have the features described below with reference to FIGS. 11-13.

Figure 11:
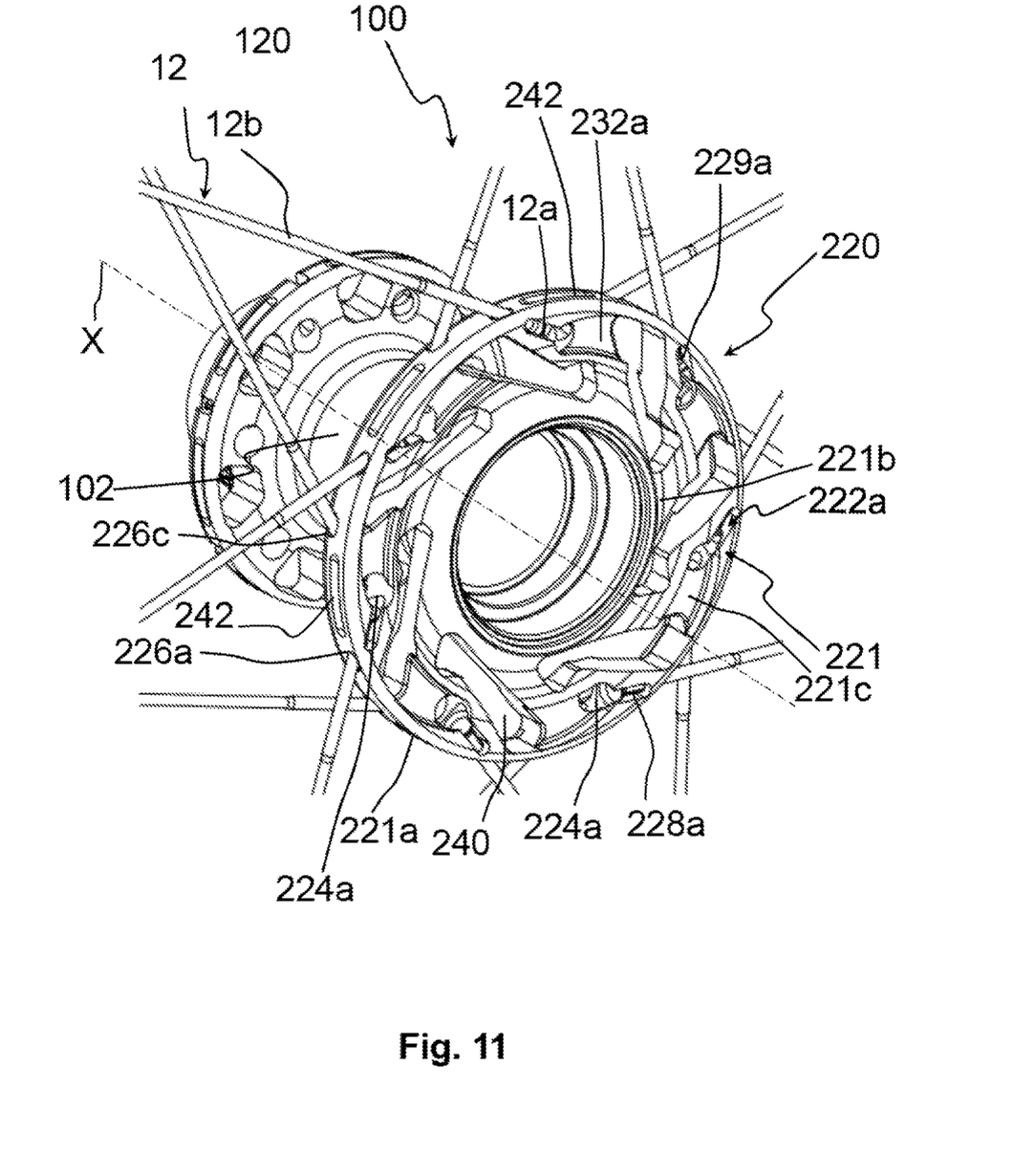
FIG. 11 is a perspective view of a second embodiment of a hub for a bicycle wheel in accordance with the present invention, such a hub comprising a first flange on which respective spokes must be mounted and a second flange on which respective spokes have been mounted, the hub being illustrated as it is seen when observing the second flange thereof in the foreground.
Figure 12:
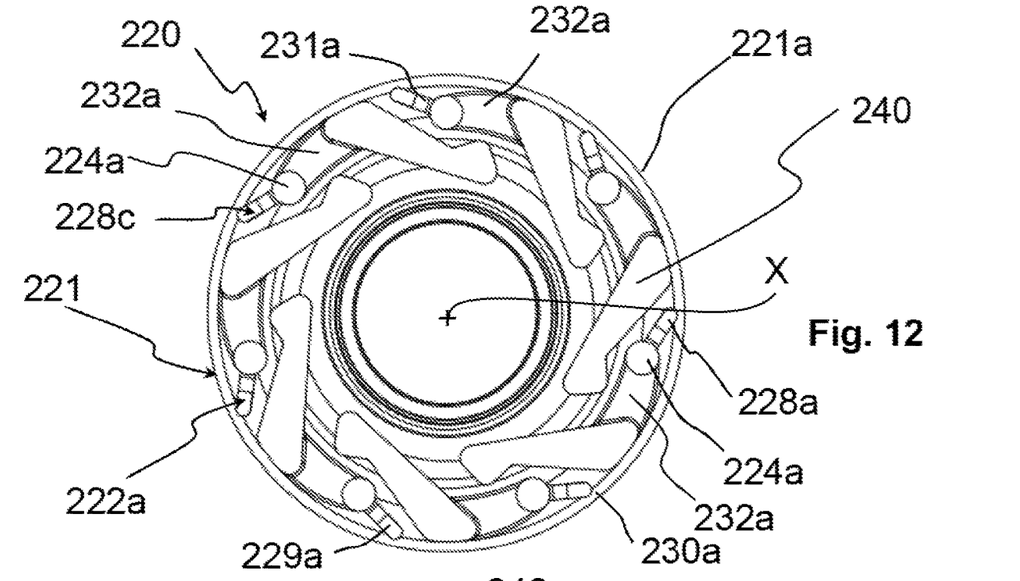
FIG. 12 is an anterior front view of the second flange of the hub of FIG. 11 before the respective spokes are mounted.
Figure 13:
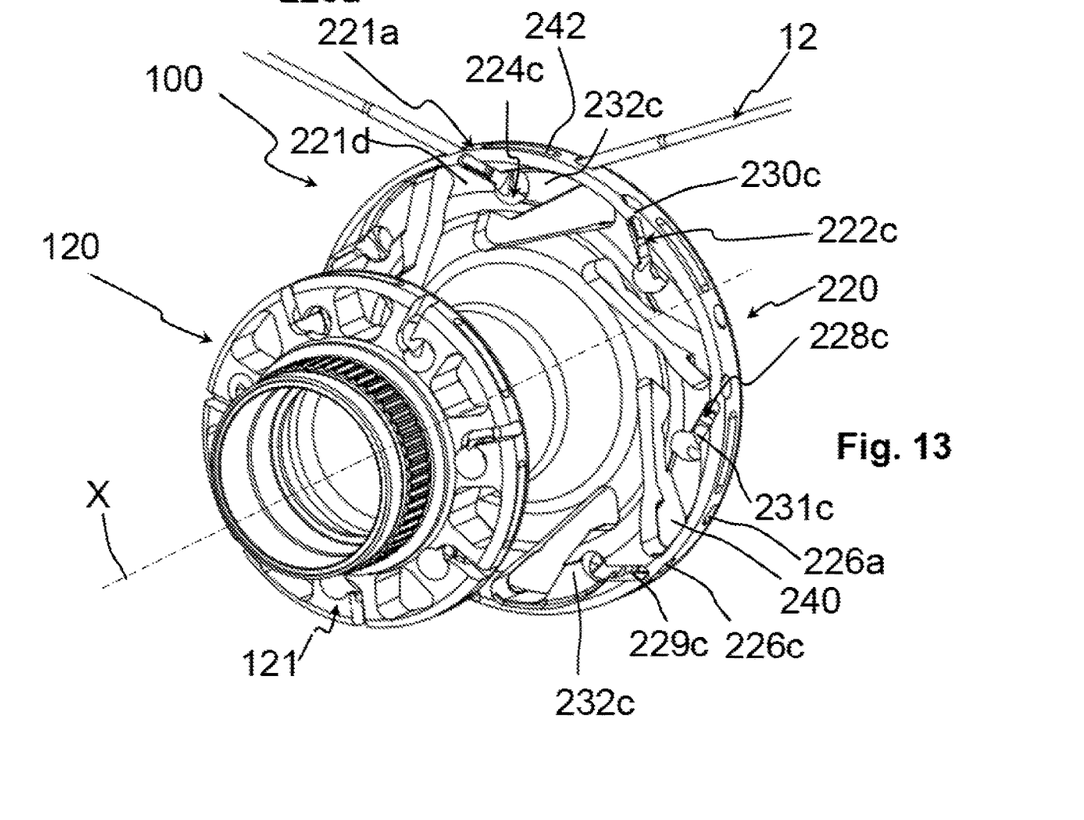
FIG. 13 is a perspective view of the hub of FIG. 11 seen from an observation point axially opposite to that of FIG. 11, i.e. when observing the first flange thereof in the foreground, and wherein two spokes have been mounted on the second flange.

The spokes 12 mounted on the flange 220 of FIGS. 7-10 and on the flange 220 of FIGS. 11-13 are also straight-head spokes. In this case, however, when the spokes 12 are mounted on the wheel, they extend entirely along non-radial directions, substantially orthogonal to the rotation axis X of the hub 100, with more or less large camber angles. For example, the camber angle can be comprised between about 1° and about 15°, with reference to a plane orthogonal to the rotation axis X of the hub 100, which also corresponds to the rotation axis of the flange 220.

The aforementioned spokes 12 have a shape identical to that of the spokes 12 mounted in the flange 120 and therefore they will not be described again. However, in the non-limiting examples shown in the figures, the spokes 12 mounted in the flange 220 have a longitudinal extension greater than that of the spokes 12 mounted in the flange 120.

The flange 220 of FIGS. 7-10, like that of FIGS. 11-13, comprises an annular body 221 that extends coaxially to the rotation axis X of the hub 100. In the non-limiting examples shown in the figures, the radial extension of the annular body 221 of the flange 220 is greater than that of the annular body 121 of the flange 120.

The annular body 221 comprises a radially outer surface 221a that, in the specific example illustrated herein, has a substantially cylindrical shape.

The annular body 221 further comprises a radially inner portion 221b, also having a substantially cylindrical shape, which is associated with the respective free end portion of the hub body 102.

The annular body 221 of the flange 220 of FIGS. 7-10 comprises a plurality of first seats 222a for housing the enlarged heads 12a of a first plurality of spokes 12.

The annular body 221 of the flange 220 of FIGS. 7-10 further comprises a plurality of second seats 222b for housing the enlarged heads 12a of a second plurality of spokes 12.

In the non-limiting example shown in FIGS. 7-10, each of the seats 222a, 222b is in part arranged in a radially outer position with respect to the seats 122 of the annular body 121 of the flange 120.

In the illustrated example fourteen seats 222a, 222b (in particular, seven seats 222a and seven seats 222b) are provided in total. They are circumferentially equally spaced apart from each other along the annular body 221. In order not to complicate the reading of FIGS. 7-10, the reference numerals relative to the aforementioned seats 222a, 222b and to the various portions of such seats 222a, 222b have been indicated only for some of the seven seats which are illustrated.

Each first seat 222a comprises a first access opening 224a configured to allow the insertion of the enlarged head 12a of a first spoke 12 in the seat 222a.

The access opening 224a is made on an anterior front face 221c of the annular body 221. Preferably, such an anterior front face 221c is substantially flat and substantially orthogonal to the rotation axis X.

In the case in which a freewheel (not illustrated) is associated with the hub 100 of FIGS. 7-13 or of FIGS. 1-6, it is arranged coaxially to the rotation axis X in a position axially adjacent to the aforementioned anterior front face 221c.

In the non-limiting example illustrated in FIGS. 7-10, the access opening 224a extends along a substantially axial direction and has a substantially cylindrical shape.

The access opening 224a can be a through opening (like in the preferred and non-limiting example illustrated in FIGS. 7-10) or a blind opening. The access opening 224a can be made through a drill bit, a front cylindrical cutter or a ball nose milling cutter.

The access opening 224a has dimensions such as to allow the insertion of the enlarged head 12a of a spoke 12.

Each seat 222a further comprises an outlet opening 226a configured to allow a stem 12b of the first spoke 12 to exit from the seat 222a.

The outlet opening 226a is made on the radially outer surface 221a of the annular body 221.

The outlet opening 226a is preferably defined by a hole of dimensions such as to allow the passage of the stem 12b of the spoke 12. In particular, such a hole is cylindrical and is arranged in a position adjacent to the anterior front face 221c.

The aforementioned hole can be made through a drill bit or a front cylindrical cutter.

Alternatively, the outlet opening 226a can be defined by a slot, so as to facilitate the passage of the stem 12b.

Figure 8:
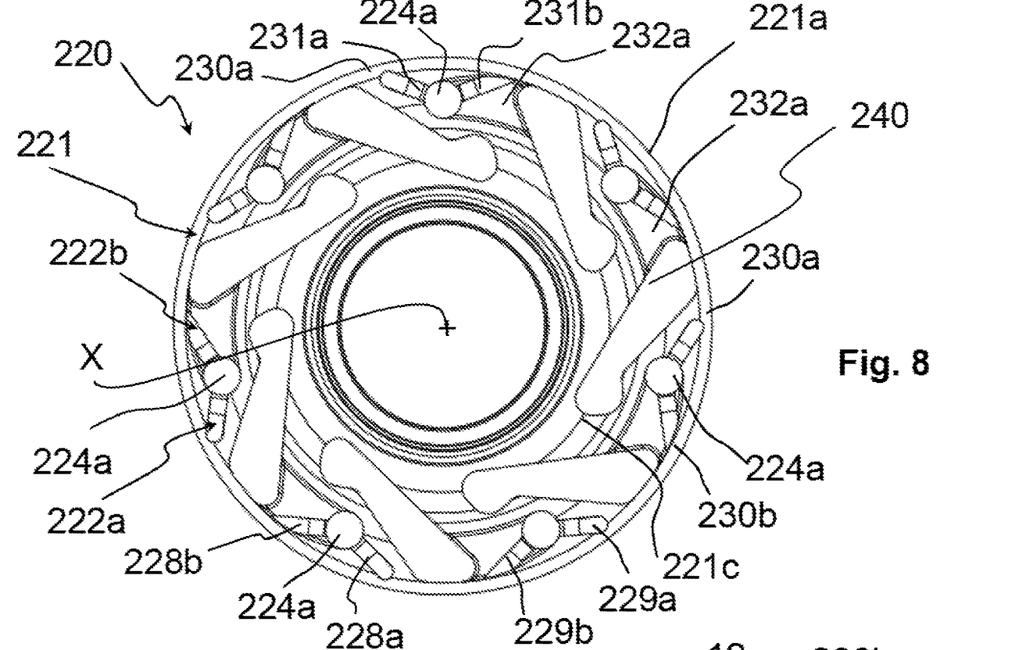
FIG. 8 is an anterior front view of the second flange of the hub of FIG. 7 before the respective spokes are mounted.
Figure 9:
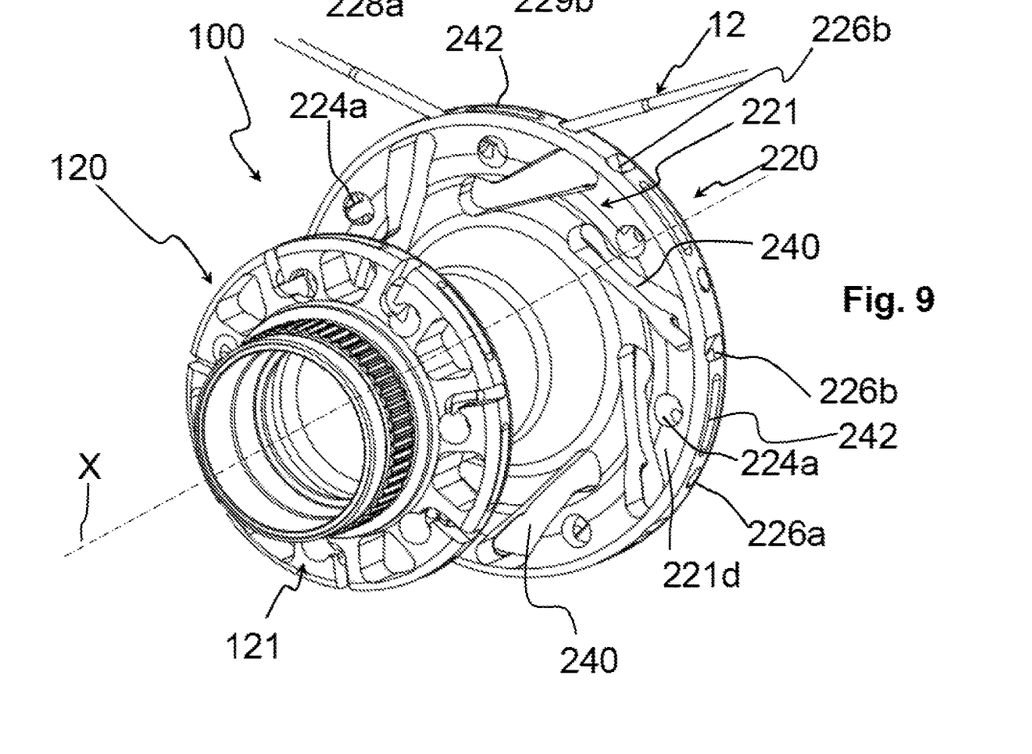
FIG. 9 is a perspective view of the hub of FIG. 1 in which respective spokes must be mounted on the first flange and two spokes have been mounted on the second flange.

As clearly illustrated in FIG. 8, the access opening 224a and the outlet opening 226a are connected to one another through a connection channel 228a.

In the non-limiting example illustrated in FIGS. 7-10, the connection channel 228a extends from the access opening 224a along a non-radial rectilinear direction.

The connection channel 228a defines on the anterior front face 221c a slit 229a that extends from the access opening 224a towards the outlet opening 226a without reaching the radially outer surface 221a. In this way, the flange 220 has, between the access opening 224a and the outlet opening 226a, a first bridge 230a defined in part on the radially outer surface 221a and in part on the anterior front face 221c. The first bridge 230a has a substantially circumferential extension and prevents the axial exit of the first spoke 12 from the connection channel 228a, in the case of detensioning thereof.

The slit 229a can be made through a cylindrical cutter.

Each access opening 224a comprises, at the connection channel 228a, an abutment surface 231a for the enlarged head 12a of the first spoke 12 when the first spoke 12 is tensioned.

The abutment surface 231a is substantially spherical.

The enlarged head 12a of the first spoke 12 preferably comprises conical or spherical surfaces which match the abutment surface 231a. Such an abutment surface 231a can be made through a ball nose milling cutter.

The annular body 221 further comprises a non-through recess 232a made on the anterior front face 221c in a position adjacent to the first access opening 224a. The non-through recess 232a is made on the substantially opposite side to the connection channel 228a, so as to have a sufficient maneuvering space on the anterior front face 221c of the flange 220 to allow the insertion of the first spoke 12 in the seat 222a.

Each second seat 222b comprises a second access opening configured to allow the insertion of the enlarged head 12a of a second spoke 12 in the seat 222b. Such an access opening is also made on the anterior front face 221c of the annular body 221.

In the non-limiting example illustrated in FIGS. 7-10, the second access opening coincides with the first access opening 224a, i.e. the first and the second access openings are defined by a single access opening extending from the first anterior front face 221c. Hereinafter, therefore, when reference will be made to the second access opening the same reference numeral 224a used for the first access opening will be used.

In an alternative embodiment that is not illustrated, the second access opening is distinct from the first access opening 224a, whilst still having the same features described above with respect to the first access opening 224a.

Each seat 222b further comprises an outlet opening 226b configured to allow the stem 12b of the second spoke 12 to exit from the seat 222b.

The outlet opening 226b is made on the radially outer surface 221a of the annular body 221.

As clearly illustrated in FIG. 10, the outlet opening 226b is defined by a slot extending along a substantially axial direction and having a circumferential dimension such as to allow the passage of the stem 12b of the second spoke 12.

Such a slot can be made through a front cylindrical cutter.

In the case in which the outlet opening 226a is defined by a slot, it preferably has dimensions smaller than those of the slot that defines the outlet opening 226b.

As illustrated in FIG. 8, the access opening 224a and the outlet opening 226a are connected to one another through a connection channel 228b.

In the non-limiting example illustrated in FIGS. 7-10, the connection channel 228b extends from the access opening 224a along a non-radial rectilinear direction, on a side substantially opposite with respect to that where the connection channel 228a extends. The directions of extension of the connection channel 228a and of the connection channel 228b are angularly offset by an angle comprised in the range between 100° and 180°, the extreme values being included. For example, the aforementioned angle can be equal to about 140°.

The connection channel 228b defines on the anterior front face 221c a slit 229b that extends from the access opening 224a towards the outlet opening 226b without reaching the radially outer surface 221a. In this way, between the access opening 224a and the outlet opening 226b the flange 220 has a second bridge 230b also defined in part on the radially outer surface 221a and in part on the anterior front face 221c. The second bridge 230b has a substantially circumferential extension and prevents the axial exit of the second spoke 12 from the connection channel 228b, in the case of detensioning thereof.

The slit 229b can be made through a cylindrical cutter.

In the example of FIGS. 7-10, the bridges 230a and 230b are connected to one another to define a single annular bridge arranged on the flange 220 at the connection edge between the anterior front face 221c and the radially outer surface 221a of the flange 220.

Each access opening 224a further comprises, at the connection channel 228b, an abutment surface 231b for the enlarged head 12a of the second spoke 12 when the second spoke 12 is tensioned.

The abutment surface 231b for the enlarged head 12a of the second spoke 12 is substantially spherical.

The enlarged head 12a of the second spoke 12 preferably comprises conical or spherical surfaces matching the abutment surface 231b. Such an abutment surface 231b can be made through a ball nose milling cutter.

As is clearly illustrated in FIG. 8, the connection channel 228b is at least in part made in the recess 232a.

The first spokes 12 mounted in the first seats 222a are substantially identical to the second spokes 12 mounted in the second seats 222b.

The annular body 221 further comprises a plurality of weight-reducing through openings 240, each of which is arranged between two circumferentially consecutive access openings 224a.

On the radially outer surface 221a of the annular body 221 a plurality of weight-reducing non-through recesses 242 are provided, each of which is arranged between an outlet opening 226a and an outlet opening 226b and is arranged at a respective access opening 224a.

The mounting of the spokes 12 on the flange 220 of the hub 100 discussed above takes place as described below.

The spokes 12 are inserted in the seats 222a, 222b accessing from the anterior front face 221c.

In particular, thanks to the provision of the non-through recess 232a, the first spokes 12 are inserted in the seats 222a making an end portion of the stem 12b of the spoke 12, opposite to the end portion where the enlarged head 12a is provided, enter into the access opening 224a and making it exit from the outlet opening 226a, until the enlarged head 12a goes into abutment against the abutment surface 231a.

Thanks to the provision of the outlet opening 226b in the form of a slot, the second spokes 12 are inserted in the seats 222b making an end portion of the stem 12b of the spoke 12, opposite to the end portion where the enlarged head 12a is provided, enter into the access opening 224a and making it exit from the outlet opening 226b, until the enlarged head 12a goes into abutment against the abutment surface 231b.

With reference to FIGS. 11-13, the annular body 221 of the flange 220 illustrated herein comprises a plurality of seats 222a for housing the enlarged heads 12a of a first plurality of spokes 12. Such seats are totally identical to those described above with reference to FIGS. 7-10 and will not be described again.

The annular body 221 of the flange 220 of FIGS. 11-13 also comprises, instead of the seats 222b described above with reference to FIGS. 7-10, a plurality of seats 222c for housing the enlarged heads 12a of a second plurality of spokes 12.

The seats 222c differ from the seats 222b and are described below.

In the non-limiting example shown in FIGS. 11-13, each of the seats 222a, 222c is in part arranged in a radially outer position with respect to the seats 122 of the annular body 121 of the flange 120.

In the illustrated example fourteen seats 222a, 222c (in particular, seven seats 222a and seven seats 222c) are provided in total. They are arranged circumferentially equally spaced apart from each other along the annular body 221. In order not to complicate the reading of FIGS. 11-13, the reference numerals relative to the aforementioned seats 222a, 222c and to the various portions of such seats 222a, 222c have been indicated only for some of the seven seats which are illustrated.

The annular body 221 of the flange 220 of FIGS. 11-13 also comprises a non-through recess 232a made on the anterior front face 221c in a position adjacent to the access opening 224a of the seat 222a. The non-through recess 232a is totally analogous to the non-through recess 232a described above with reference to the flange 220 illustrated in FIGS. 7-10.

Each seat 222c comprises an access opening 224c configured to allow a second spoke 12 to be mounted in the seat 222c.

The access opening 224c is made on a rear front face 221d of the annular body 221. Preferably, such a rear front face 221d is substantially flat and substantially orthogonal to the rotation axis X.

In the non-limiting example illustrated in FIGS. 11-13, the access opening 224c extends along a substantially axial direction and has a substantially cylindrical shape.

The access opening 224c can be a through opening (like in the non-limiting example illustrated in FIGS. 11-13 and as specified below) or a blind opening. The access opening 224c can be made through a drill bit, a front cylindrical cutter or a ball nose milling cutter.

The access opening 224c has dimensions such as to allow the insertion of the enlarged head 12a of the second spoke 12.

In the non-limiting example illustrated in FIGS. 11-13, the access opening 224c and the access opening 224a are defined by a single access through opening extending from the rear front face 221d to the anterior front face 221c.

Each seat 222c further comprises an outlet opening 226c configured to allow a stem 12b of the second spoke 12 to exit from the seat 222c.

The outlet opening 226c is made on the radially outer surface 221a of the annular body 221.

The outlet opening 226c is preferably defined by a hole having dimensions such as to allow the passage of the stem 12b of the second spoke 12. In particular, such a hole is cylindrical and is arranged in a position adjacent to the rear front face 221d.

Alternatively, the outlet opening 226c can be defined by a slot, so as to facilitate the passage of the stem 12b.

The outlet opening 226c can be made through a drill bit or, particularly in the case in which it is defined by a slot, by a front cylindrical cutter.

As clearly illustrated in FIG. 12, the access opening 224c and the outlet opening 226c are connected to one another through a connection channel 228c.

In the non-limiting example illustrated in FIGS. 11-13, the connection channel 228c extends from the access opening 224c along a non-radial rectilinear direction. The connection channel 228c extends, relative to the access opening 224c, from a substantially opposite side with respect to that where the connection channel 228a extends. The directions of extension of the connection channel 228a and of the connection channel 228c are angularly offset by an angle comprised within the range between 100° and 180°, the extreme values being included.

The connection channel 228a defines on the rear front face 221d a slit 229c that extends from the access opening 224c towards the outlet opening 226c without reaching the radially outer surface 221a. In this way, between the access opening 224c and the outlet opening 226c the flange 220 has a bridge 230c defined in part on the radially outer surface 221a and in part on the rear front face 221d. The bridge 230c has a substantially circumferential extension and prevents the axial exit of the second spoke 12 from the connection channel 228c, in the case of the detensioning thereof.

In the example of FIGS. 11-13, the bridges 230a define in the anterior front face 221c of the flange 220 a single annular bridge arranged on the flange 220 at the connection edge between the anterior front face 221c and the radially outer surface 221a of the flange 220 and the bridges 230b define in the rear front face 221d of the flange 220 a single annular bridge arranged on the flange 220 at the connection edge between the rear front face 221d and the radially outer surface 221a of the flange 220.

The slit 229c can be made through a cylindrical cutter.

Each access opening 224c comprises, at the connection channel 228c, an abutment surface 231c for the enlarged head 12a of the second spoke 12 when the second spoke 12 is tensioned.

The abutment surface 231c is substantially spherical.

The enlarged head 12a of the second spoke 12 preferably comprises conical or spherical surfaces matching the abutment surface 231c. Such an abutment surface 231c can be made through a ball nose milling cutter.

The annular body 221 comprises a non-through recess 232c made on the rear front face 221d in a position adjacent to the access opening 224c. The non-through recess 232c is made on substantially the opposite side to the connection channel 228c, so as to have a sufficient maneuvering space on the rear front face 221*d* of the flange 220 to allow the insertion of the second spoke 12 in the seat 222*c*.

The first spokes 12 mounted in the first seats 222*a* are substantially identical to the second spokes 12 mounted in the third seats 222*c*.

The annular body 221 further comprises a plurality of weight-reducing through openings 240, each of which is arranged between two circumferentially consecutive access openings 224*c*.

Similarly to the flange of FIGS. 7-10, also on the radially outer surface 221*a* of the annular body 221 of the flange of FIGS. 11-13 a plurality of weight-reducing non-through recesses 242 are provided, each of which is arranged between an outlet opening 226*a* and an outlet opening 226*c* and is arranged at a respective access opening 224*a* (or 224*c*).

The mounting of the spokes 12 on the flange 220 of the hub 100 of FIGS. 11-13 takes place as described below.

Thanks to the provision of the non-through recess 232*a* on the anterior front face 221*c* of the flange 220, the first spokes 12 are inserted in the seats 222*a* in a totally analogous manner to what has been stated above with reference to the mounting of the spokes 12 in the seats 222*a* of the flange 220 of FIGS. 7-10.

Thanks to the provision of the non-through recess 232*c* on the rear front face 221*d* of the flange 220, the second spokes 12 are inserted in the seats 222*c* making an end portion of the stem 12*b* of the spoke 12, opposite to the end portion where the enlarged head 12*a* is provided, enter into the access opening 224*c* and making it exit from the outlet opening 226*c*, until the enlarged head 12*a* goes into abutment against the abutment surface 231*c*.

In the case in which the hub 100 is intended to be used in a front wheel of the bicycle, the flange 220 is mounted on the hub 100 on the same side in which the brake disc is mounted.

In an embodiment that is not illustrated of the hub 100 of the present invention, the flange 120 is identical to one of the flanges 220 described above with reference to FIG. 7-10 or 11-13.

Of course, those skilled in the art, in order to satisfy specific and contingent requirements, can bring numerous modifications and variants to the present invention as described above, all of them being in any case within the scope of protection defined by the following claims.

What is claimed is:

1. A spoke attachment flange for a hub for a bicycle wheel, said flange having an annular body extending coaxially to a rotation axis (X), said annular body having a plurality of seats for housing enlarged heads of spokes, each of said seats comprising:
    an access hole made on a front face of said annular body and configured to allow insertion of the enlarged head of a spoke in said seat;
    an outlet opening that opens onto a radially outer surface of said annular body and onto said front face and configured to hold said enlarged head in said seat when the spoke is tensioned;
    wherein said access hole and said outlet opening are circumferentially spaced apart from each other and are connected to one another through a connection channel made on said front face and comprising, at least close to or at said outlet opening, at least one front abutment surface configured to go into abutment against said enlarged head upon detensioning of the spoke, thus preventing an axial exit of said enlarged head from said outlet opening.

2. The flange according to claim 1, wherein said connection channel comprises a first front abutment surface extending up to said outlet opening.

3. The flange according to claim 2, wherein said connection channel comprises a second front abutment surface extending up to close to said outlet opening.

4. The flange according to claim 3, wherein said first front abutment surface is arranged in a radially inner position with respect to said second front abutment surface.

5. The flange according to claim 1, wherein said connection channel extends along a substantially circumferential direction between said access hole and a radially inner end portion of said outlet opening.

6. The flange according to claim 5, wherein said seat comprises, in a radially inner position with respect to said outlet opening, a substantially spherical first seat portion.

7. The flange according to claim 1, wherein said outlet opening extends along a substantially radial direction.

8. The flange according to claim 7, wherein said outlet opening has a substantially constant circumferential width in the radial direction and such as to allow a stem of the spoke to be housed therein.

9. The flange according to claim 1, wherein said access hole extends along a substantially axial direction.

10. The flange according to claim 1, wherein said access hole has a substantially cylindrical shape.

11. The flange according to claim 1, wherein said connection channel comprises a first channel portion having a first radial width substantially equal to that of said access hole and, in a position axially adjacent to said first channel portion, a second channel portion having a radial width smaller than said first radial width and such as to allow the passage of a stem of the spoke.

12. The flange according to claim 11, wherein said first channel portion is substantially spherical.

13. A method for mounting a spoke on a flange of a hub for a bicycle wheel, said spoke having an enlarged head and a stem, the method comprising the steps of:
    inserting said enlarged head in an access hole made on a front face of the flange;
    moving said spoke from said access hole until an outlet opening that is circumferentially spaced apart from said access hole and that opens onto a radially outer surface and onto said front face of said flange is reached, said movement being carried out by acting on said stem and making said enlarged head slide along a connection channel made on said front face and connecting said access hole to said outlet opening;
    when said enlarged head has reached said outlet opening, rotating said spoke until said stem is housed in said outlet opening; and,
    tensioning the spoke.

14. A method for manufacturing a hub for a bicycle wheel, the method comprising the steps of:
    making a flange having an annular body extending coaxially to a rotation axis (X);
    forming on said annular body a plurality of seats for housing enlarged heads of spokes, wherein each of said seats is formed through the following steps:
    making on a front face of said annular body an access hole having dimensions such as to allow insertion of an enlarged head of a spoke in said seat;
    making in said annular body a connection channel extending from said access hole along a non-radial direction and having at least one front abutment surface configured to go into abutment against said enlarged head upon detensioning of the spoke; and, making an outlet opening that opens onto a radially outer surface of said annular body and onto said front face until said connection channel is reached, said outlet opening being configured to hold said enlarged head in said seat when the spoke is tensioned.

15. The method according to claim 14, wherein said connection channel is made through a ball nose milling cutter.

* * * * *